United States Patent
Kondo

(10) Patent No.: US 7,950,852 B2
(45) Date of Patent: May 31, 2011

(54) LINEAR MOTION GUIDE UNIT WITH INSIDE SEAL

(75) Inventor: Masatoshi Kondo, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 487 days.

(21) Appl. No.: 12/108,143

(22) Filed: Apr. 23, 2008

(65) Prior Publication Data

US 2008/0279489 A1  Nov. 13, 2008

(30) Foreign Application Priority Data

May 10, 2007  (JP) ................................. 2007-125194

(51) Int. Cl.
*F16C 33/72* (2006.01)
*F16C 29/06* (2006.01)
(52) U.S. Cl. .......................................... 384/15; 384/45
(58) Field of Classification Search .................... 384/13, 384/43–45, 49, 54, 130, 147; 277/412
See application file for complete search history.

(56) References Cited

U.S. PATENT DOCUMENTS

| 4,918,846 A * | 4/1990 | Tsukada .......................... 384/15 |
| 5,275,492 A * | 1/1994 | Shirai .............................. 384/45 |
| 5,492,412 A | 2/1996 | Tsukada |
| 5,871,282 A * | 2/1999 | Yuasa .............................. 384/44 |
| 6,113,272 A * | 9/2000 | Michioka et al. ................ 384/15 |
| 2006/0260425 A1* | 11/2006 | Mizumura et al. ........... 74/89.32 |

FOREIGN PATENT DOCUMENTS

JP  7293561 B2  11/1995

* cited by examiner

*Primary Examiner* — Marcus Charles
(74) *Attorney, Agent, or Firm* — Browdy and Neimark, PLLC

(57) ABSTRACT

An inside seal is installed in a recess open downward in the slider to keep load-carrying races kept free of foreign materials that have already crept into the inside of the slider. The inside seal is composed of a metallic core and a sealing member that includes a joint portion secured to the core and a major portion integral with the joint portion. The joint portion has a mating surface to come into engagement with a downward surface deep inside the recess cut in a carriage while the major portion includes a first lip to come into sliding engagement with a guide rail, a second lip come into abutment against an inward sidewall of the recess, and third lip to come into abutment against the downward surface.

8 Claims, 6 Drawing Sheets

LINEAR MOTION GUIDE UNIT WITH INSIDE SEAL

FIELD OF THE INVENTION

The present invention relates to a linear motion guide system befitted to machinery including machine tools, industrial machines, and so on, which are needed to operate in severe working environment where much foreign materials including chips, debris, dirt, dusts, and so on occurs or any liquid including processing fluids, coolants, and so on splashes. More particularly, it relates to a linear motion guide system with an inside sealing unit to keep load-carrying races free of any foreign material creeping into a slider that fits over or conform to a guide rail for relatively sliding movement.

BACKGROUND OF THE INVENTION

As applications of the linear motion guide units grow in recent years to include the machinery working in increased operating severity, modern linear motion guide units increasingly need to work over a prolonged service life even under harshest atmosphere in which much foreign material including chips, debris, dirt, dusts, and so on occurs. Making sure of operation of the linear motion guide units in the harshest environment is first to keep the interior of the slider free of foreign materials or contaminants. Even with any invasion of outside foreign materials into the slider, the most significant issue is how to protect at least the circulating circuit including the load-carrying races to allow the rolling elements running through there against the foreign materials or contaminants. What's more, many of modern linear motion guide units are customized to have no conventional dustproof means including a telescopic cover, bellows, and so on despite laying their guide rails bare to the severe working atmospheres from the aspect of making the guide units themselves compact in construction, cost savings on installations, and so on while keeping the circulating circuits for the rolling elements free of the foreign material or contaminants.

A linear guide system is disclosed in Japanese Laid-Open Patent Application No. H07-301 232 in which there is provided a ball retainer with inner seals, which is composed of a rectangular metallic core plate coated with rubber or synthetic resins and made at forward and aft ends thereof with engaging parts in a way extending beyond the forward and aft ends in lengthwise direction of the core plate. On lengthwise side edges spaced away widthwise from one another, there are each provided a ball receiving-groove made curved in section, and an inner seal coming into sliding contact with both the top surface of the guide rail and the inward surface inside the slider facing on the guide rail. The ball retainer with inner seals is installed inside the recess in the slider with the forward and aft engaging parts coming into engagement with their mating recesses in the forward and aft end caps. The balls are charged into the load-carrying races after the installation of the ball retainer with inner seals.

However, the inner seals in the prior linear guide system as stated earlier, because of constructed to double as the ball retainer, is insufficient in sealing performance and therefore unfit for prolonged operation under the service severity as stated above. Moreover, the ball retainer with inner seals by itself would get larger in height in section and therefore couldn't fit the current demand to make the linear guide system compact or slim in construction.

Another linear motion rolling guide unit is disclosed in the commonly-assigned Japanese Patent No. 3 307 504 in which there is no need to disassemble the end caps away from the carriage to get an upper seal out of the slider. With the linear motion rolling guide unit envisaged as stated earlier, an upper seal placed inside a recess in the slider is made mounted and/or demounted easily out of a mortise cut into downward bulgy portion of the end cap, thereby helping shrink the linear motion guide unit in crosswise sectional height. With the prior linear motion rolling guide unit, the upper seal is made up of a core metal sheet with tenons at forward and aft ends thereof, and lip-type seals secured to side edges of the metal sheet. Once assembled, the lip-type seals come into abutment against their associated end seals. After having loosened screws to unfasten the end seals, the upper seal kept by them against lengthwise movement under duress is untied from the end seals to be allowed moving in longitudinal direction thereof. Lengthwise shift of the upper seal towards the untied end seal allows the opposing tenon to easily come out of the associated mortise. With the linear motion rolling guide unit constructed as stated earlier, thus, just loosening the screws tightened on the end seal is sufficient to disassemble the upper seal from the slider with no need of removal of the end caps from the carriage.

Nevertheless, it still remains a major challenge to develop the linear motion guide units with an inside seal installed within the slider, in which the inside seal is ensured in precious position control of sealing locations, smooth sliding contact of lip-type seals with the top surface of the guide rail, and in protection of the load-carrying races against foreign materials or contaminants that would otherwise creep between the top surface of the guide rail and the carriage and/or end caps of the slider, thereby keeping the load-carrying races free of foreign materials or contaminants.

SUMMARY OF THE INVENTION

The present invention has for its primary object to overcome the major challenge as stated earlier with a further advance of the technical concept in the linear motion rolling guide unit that is disclosed in the commonly-owned patent as recited earlier. The present invention is best befitted for the linear motion guide units of the type in which the rollers are selected as rolling elements as often used in machine tools. More particular, the present invention is intended to be the provision of the linear motion guide unit that would be used incorporated in the machine tools, industrial machines, and so on, which are needed to operate in worse working environment because of the occurrence of much foreign materials including dust, chips, cutting debris, and so on, or the presence of splashed fluids of cutting fluids, coolants, and so on. To this end, the linear motion guide system of the present invention is provided with an inside seal that is installed inside a slider to keep especially circulating circuits allowing rollers rolling through there free of any foreign materials or contaminants. What's more, the inside seal is designed to make certain of smooth sliding contact of lip-type seals thereof with the guide rail and additional closer engagement with both the carriage and end caps to ensure more sealing performance.

The present invention is concerned with a linear motion guide unit comprising an elongated guide rail having a first raceway surface on a side thereof extending in a lengthwise direction of the guide rail, and a slider fitting over and conforming to the guide rail to move lengthwise of the elongated guide rail in a sliding manner by virtue of more than one rolling element, the slider being composed of a carriage having thereon a second raceway surface in opposition to the first raceway surface of the guide rail to define a load-carrying race between them and having therein a return passage extending in parallel with the load-carrying race, end caps secured to forward and aft ends of the carriage, one to each end, and made therein with turnaround passages joining the load-carrying race and the return passage together with one another, more than one rolling element allowed to roll through a circulating circuit made up of the load-carrying race, return passage and the turnaround passages, and an inside seal fitted to a downward surface inside a recess of the carriage in opposition to a top surface of the guide rail;

wherein the inside seal is composed of a metallic core of flat metal sheet extending across an overall length of downward surfaces inside the recesses of the carriage and end caps, and a sealing member secured to the metallic core;

wherein the metallic core is provided at forward and aft ends thereof with lugs, which extend at widthwise middles to come into engagement with their associated mating portions of the end caps 4 to keep the inside seal in the end caps;

wherein the sealing member includes a first lip coming into sliding engagement with any one of widthwise opposing edges of the top surface of the guide rail to prevent foreign materials against creeping along the top surface of the guide rail into the load-carrying race, and a second lip extending sidewise to come into close engagement with a inward sidewall of the recess in the carriage to protect the load-carrying race against foreign materials, which creep along recessed surfaces inside the carriage; and wherein the second lip is made to extend in direction opposite to the first lip to keep the first lip at a location to make certain of smooth sliding engagement with the top surface of the guide rail.

In one aspect of the present invention, a linear motion guide unit is disclosed in which the first and second lips lie on a common line in a way heading for directions opposite to one another, and wherein the first lip extends inward of the inside seal while the second lip heads outward.

In another aspect of the present invention, a linear motion guide unit is disclosed in which the sealing member of the inside seal is composed of a joint portion having a mating surface to make close engagement with a downward surface deep sunken inside the recess cut into the carriage, the joint portion being secured to any one of widthwise opposing edges of the metallic core, and a major portion integral with the joint portion and having the first lip and second lip, which are all made integrally with the major portion.

In another aspect of the present invention, a linear motion guide unit is disclosed in which the joint portion is fastened to the metallic core to keep the first lip at a situation to ensure smooth sliding engagement with the top surface of the guide rail while keeping the second lip at a location to make secure engagement with the associated sidewall inside the recess made in the carriage.

In another aspect of the present invention, a linear motion guide unit is disclosed in which the mating portion of the end cap defines a slot to allow the associated lug of the inside seal entering there, and wherein the slot is made to include a relieving depression cut in the downward surface inside the recess of the end cap.

In a further another aspect of the present invention, a linear motion guide unit is disclosed in which the downward surfaces inside the end caps are set back upward with respect to the downward surface inside the carriage to make shoulders between them to make it easier to introduce the metallic core of the inside seal into the slot while carried on the mating portion of any one of the end caps in an orientation tilted somewhat in relation to the end cap.

In another aspect of the present invention, a linear motion guide unit is disclosed in which the third lips are made at forward and aft ends of the metallic core to make close engagement with the downward surfaces inside the end caps, keeping foreign materials against creeping along the downward surfaces of the end caps into the load-carrying races.

In another aspect of the present invention, a linear motion guide unit is disclosed in which the metallic core of the inside seal is made at the forward and aft ends thereof with the middle lugs and sidewise opposite side edges isolated from the middle lugs by cuts and extended lengthwise beyond the middle lugs, and wherein the side edges are placed in a relation the mating portion of the end cap are flanked with them. On installation of the inside seal into the linear motion guide unit, moreover, the metallic core of the inside seal is first pushed in an orientation tilted somewhat forward through the associated slot while carried on the mating portion of any one of the forward and aft end caps coupled together to the forward and aft end surfaces of the carriage, and then the end seals are fastened on outward surfaces of the end caps to come into abutment against foremost ends of the side edges of the metallic core to keep the inside seal in place.

With the linear motion guide unit constructed as stated earlier and applied the machinery including machine tools, and so on, which causes much foreign materials and/or liquid splashes, even when the foreign materials or contaminants creep into the slider to adhere to the top surface of the guide rail, the lip-type seals of the inside seal installed on the downward surface inside the slider serves to prevent completely the foreign materials or contaminants against the load-carrying races where the rolling elements roll through there, making sure of smooth sliding motion of the slider on the guide rail. Moreover, the inside seal is not only easier to mount it inside the slider, but beneficial in compact or slim construction of the linear motion guide unit and inexpensive in production.

DETAILED DESCRIPTION OF THE PREFERRED EMBODIMENTS

The linear motion guide unit constructed according to the present invention is best adapted for use in machinery as diverse as machine tools including cutting machines, grinding machines and woodcutting machines, and other industrial machines, which are needed to operate in worse working environment because of the occurrence of much foreign materials including dust, chips, cutting debris, and so on, or the presence of splashed fluids of cutting fluids, coolants, and so on. In the worse working conditions as stated earlier, the load-carrying races defined between a guide rail and a slider moving on the guide rail must be especially kept free of all possible foreign materials or contaminants, even when they could creep into the interior of the slider along the guide rail.

Referring now in detail to the drawings, the linear motion guide unit according to the present invention will be explained below. With the linear motion guide unit, an inside seal 7 installed deep into a recess in a slider 2 helps to exclude securely any foreign material from circulating circuits, even in worse working conditions encountered in the machinery including machine tools, industrial machines, and so on. In the version or embodiment disclosed, the linear motion guide unit is of such construction that rolling elements are rollers 5 commonly used for the machine tools.

Figure 1:
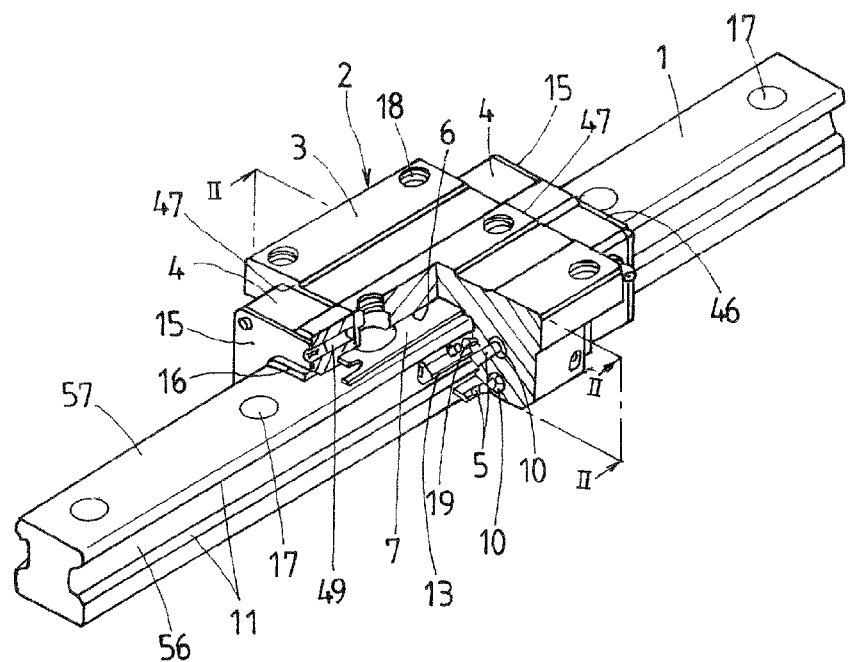
FIG. 1 is a partially cutaway view in perspective illustrating a preferred embodiment of a linear motion guide unit according to the present invention.
Figure 2:
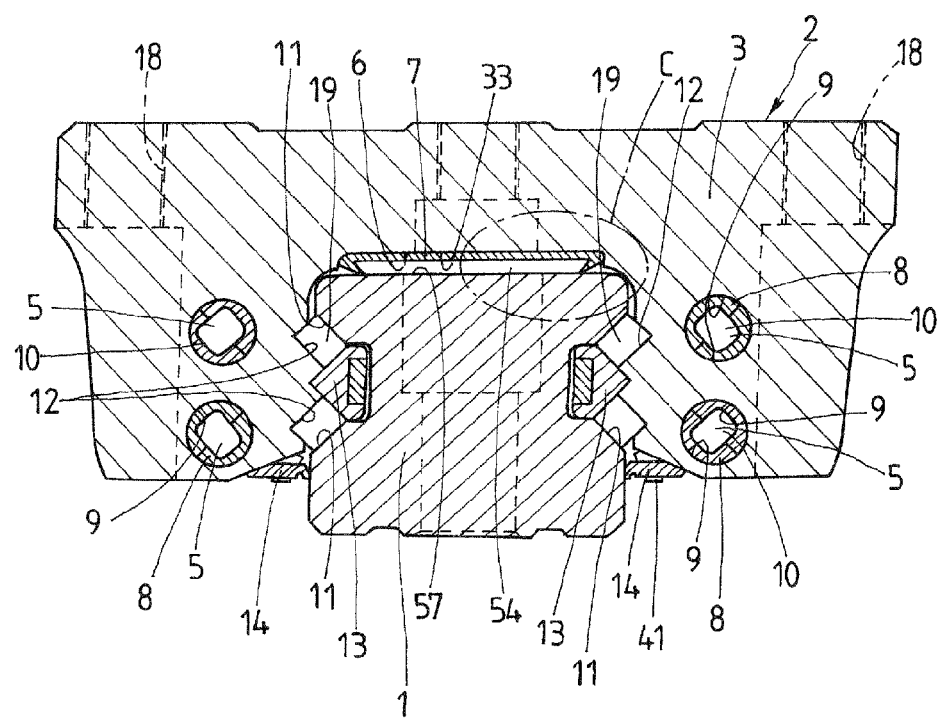
FIG. 2 is an enlarged view in transverse section along the plane of the line II-II of FIG. 1.

The linear motion guide unit as shown in FIGS. 1 and 2 is mainly comprised of an elongated guide rail 1 made on each lengthwise side 56 thereof with a pair of raceway surfaces 11 or first raceway surfaces, and a slider 2 that fits over or conform to the guide rail 1 in a way moving relatively to the guide rail 1 by virtue of more than one cylinder or roller 5. The slider 2 is mainly composed of a carriage 3 made thereon with raceway surfaces 12 or second raceway surfaces lying in opposition to the raceway surfaces 11 on the guide rail 1 to define load-carrying races 19 between opposite raceway surfaces and 12 and further made therein with return passages 10 extending in parallel with the load-carrying races 19, forward and aft end caps 4 disposed on lengthwise opposing end faces 47 of the carriage 3 and further made therein with turnaround passages 45 to join the fore-and-aft load-carrying races 19 to their associated return passages 10, respectively, and retainer plates 13 secured in the associated load-carrying race 19 in the carriage 3 in a way lying lengthwise of the carriage 3 to retain the rollers 5, which are allowed rolling through circulating circuits, each of which is made up of any one of the load-carrying races 19, the associated return passage 10 and a pair of the forward and aft turnaround passages 45. The return passage 10 is constituted with a sleeve 8 that fits into a fore-and-aft hole 9 made in the carriage 3. With linear motion guide unit constructed as stated earlier, the guide rail 1 is made therein with bolt holes 17 that are used to fasten the guide rail 1 to any mounting base, while the carriage 3 is made therein with threaded holes 18 each including a counterbore 48, which are used to install any other object thereon.

Figure 5:
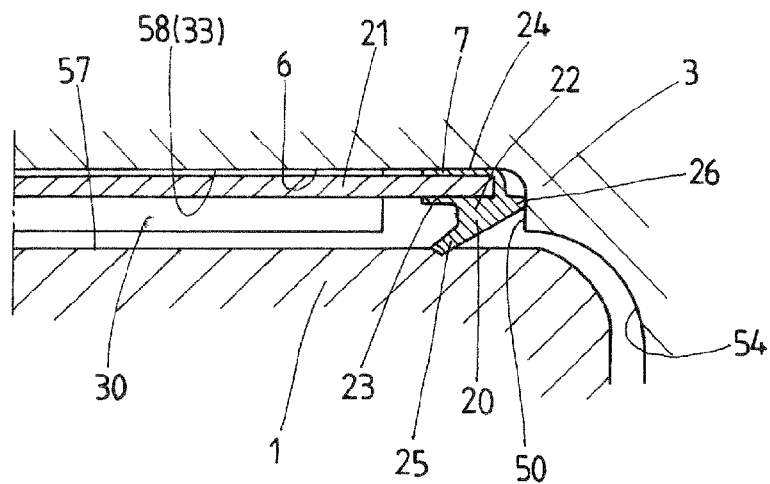
FIG. 5 is an enlarged fragmentary view in section showing in detail a particular portion encircled with a sign C in the linear motion guide unit of FIG. 2.
Figure 6:
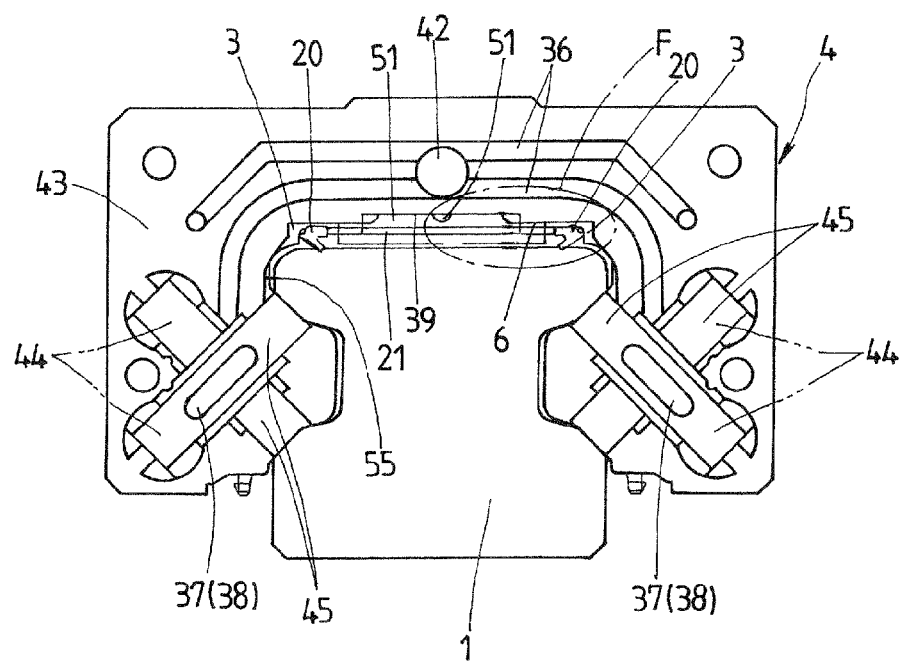
FIG. 6 is a view in transverse section taken on the plane of the line VI-VI in the slider of FIG. 3 to illustrate the geometry between a guide rail and an end cap.
Figure 7:
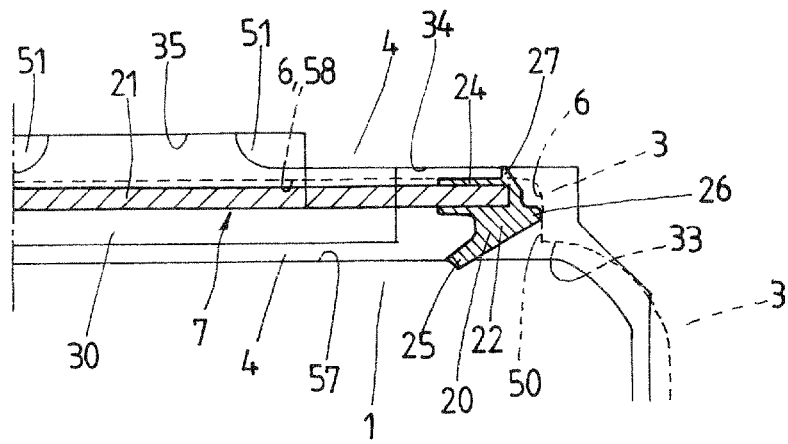
FIG. 7 is an enlarged fragmentary view in section showing in detail a particular portion encircled with a sign F in the end cap of FIG. 6.

As the rollers 5 in the load-carrying races 19 run through between the raceway surfaces 11 and 12 while subjected to heavy load, any seals are inevitable to close clearances left between the guide rail 1 and the slider 2, excluding foreign materials that would otherwise cause any failure in sliding, excessive wear, damages, and so on. To cope with this, the linear motion guide units are commonly provided on outward end surfaces 46 of the end caps 4 with forward and aft end seals 15 having lips 16 outward to close the clearances between the guide rail 1 and the slider 2, and further sidewise lower seals 14 are arranged underneath bottoms of all the carriage 3 and end caps 4 of the slider 2. The linear motion guide unit of the present invention features that an inside seal 7 constructed as stated later with reference to FIGS. 3 to 12 is installed inside the slider 2 to keep effectively the foreign materials against creeping into the load-carrying races 19 along a top surface 57 of the guide rail 1 lying inside the slider 2, thereby making sure of long-lasting service life of the linear motion guide unit irrespective of the worse or severe working environment. With the linear motion guide unit constructed as stated earlier, the carriage 3 and end caps 4 to make the slider 2 in combination with one another are both recessed at 54, 55 to form the same inverted U-shapes defined with widthwise opposing bulgy sides and ceiling surfaces or downward surfaces 33, 34 straddling across the recesses 54, 55 to connect the widthwise opposing bulgy sides with each other. The inside seal 7 is installed deep inside the recesses 54, 55 in a way lying in close along the downward surfaces 33, 34. In the sidewise opposing bulgy portions of the carriage 3 of the slider 2 spaced parallel by the recess 54, there are provided paired circulating circuits, respectively, in such geometry as shown in FIG. 2. The rollers 5 rolling through one of the paired circulating circuits are allowed to transfer from the downside race 19, carrying downward load because of the slider 2, into the associated upside return passage 10 in the carriage 3 in a circulating manner. In contrast, the rollers 5 rolling through the other of the paired circulating circuits are allowed to transfer from the upside race 19, carrying upward load because of the slider 2, into the associated downside return passage 10 in the carriage 3 in a circulating manner. The turnaround passages 45 made in the end caps 4, as shown in FIG. 6 or 13, are arranged to intersect one another in a fashion staggered one another in each of the sidewise opposing bulgy portions of the end caps 4 of the slider 2 spaced parallel by the recess 55.

The linear motion guide unit of the present invention, especially, features that the inside seal 7 distinctive in construction is placed in a groove 6 cut deep into the downward surface 33 recessed inside the carriage 3 in opposition to the top surface 57 of the guide rail 1. The inside seal 7 is composed of a metallic core 21 of flat metal sheet extending along the overall length of the downward surfaces 33, 34 of the carriage 3 and end caps 4 and having mounted at widthwise opposite edges thereof with sealing members 20. The metallic core 21 has forward and aft lugs 29, which extend at widthwise middles beyond the forward and aft ends of the metal sheet so as to come into engagement with their associated mating portions 30 of the end caps 4 to keep the inside seal 7 on the end caps 4. Each sealing member 20 includes a mating surface 24 to make close engagement with a sunken surface 58 in the groove 6 cut into the carriage 3, joint portion 23 to be secured to any one of the widthwise opposing edges of the metallic core 21, and a major portion 22 integral with the joint portion 23 and having a first lip 25, a second lip 26 and a third lip 27, which are all made integrally with the major portion 22. On the major portions 22 of the sealing members 20, more especially, there are made integrally the first lips 25 coming into sliding engagement with their associated widthwise edges of the top surface 57 of the guide rail 1 to prevent foreign materials against creeping along the top surface 57 of the guide rail 1 into the load-carrying races 19. The second lips 26 integral with the major portions 22 of the sealing members 20 extend sidewise beyond the side edges of the metallic core 21 to come into close engagement with their associated sidewall 50 of the groove 6 in the carriage 3, excluding foreign materials, which would otherwise creep along the ceiling surface 33 of the carriage 3 into the load-carrying races 19. The third lips 27 are made at forward and aft ends of the metallic core 21 to make close engagement with the downward surfaces 34 of the end caps 4, keeping foreign materials against creeping along the downward surfaces 34 of the end caps 4 into the load-carrying races 19.

Moreover, the second lips 26 are made to extend oppositely in direction to their associated first lips 25 to enhance the first lips 25 in stiffness in the direction of sliding engagement, thereby helping the first lips 25 keep their adequate locations to make sure of smooth sliding engagement against the top surface 57 of the guide rail 1. Especially, the first and second lips 25, 26 lie on a common line in a way heading for directions opposite to one another. Thus, the first lips 25 extend inward of the inside seal 7 while the second lips 26 head outward. The joint portions 23 serve to fasten the sealing members 20 to the metallic core 21 in a fashion keeping the first lips 25 at smooth sliding engagement with the top surface 57 of the guide rail 1 while making sure of close engagement of the second lips 26 against the sidewalls 50 of the groove 6 cut in the carriage 3.

Figure 4:
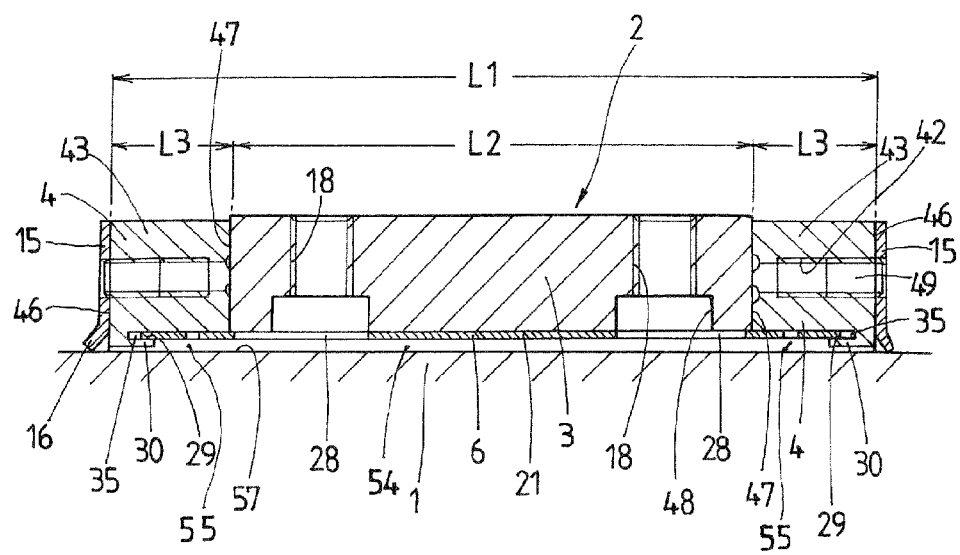
FIG. 4 is a view in longitudinal section of the slider of FIG. 3, the view being taken on the plane of the line IV-IV of that figure.

As seen in FIG. 4, the mating portions 30 of the forward and aft end caps 4 define slots 35 each of which allows the associated lug 29 of the inside seal 7 passing forward through there. The slots 35 are each made large in size to include a relieving depression 39 (refer to FIG. 13) to make the accuracy in location better. Thus, the mating portion 30 is provided to define the slot 35 that merges with no discrepancy into the relieving depression 39 cut in the downward surface 34 of the end cap 4. Moreover, the downward surfaces 34 of the end caps 4 are set back upward with respect to the downward surface 33 recessed inside the carriage 3 to make shoulders 53 between them. Upon assembly of the inside seal 7 into the slider 2, the forward and aft end caps 4 are first secured to their associated end surfaces 47 of the carriage 3, respectively. Any one of the forward and aft lugs 29 of the metallic core 21 in the inside seal 7 is then inserted into the slot 35 while carried on the mating portion 30 of any of the forward and aft end caps 4 in an orientation tilted somewhat in relation to the downward surface 34 of the end cap 4. After the one lug 29 has been retracted deep into the slot 35 cut in the associated end cap 4, another lug 29 opposite to the one lug 29 is ready for the insertion into the opposite slot 36 made above the mating portion 30 of another end cap 4 to bear the inside seal 7 at the forward and aft lugs 29 against their associated mating portions 30 to straddle across the carriage 3. Then, the forward and aft end seals 15 are fastened to their associated end caps 4, respectively, so as to come into abutment against forward and aft ends 60 of the metallic core 21 jutting lengthwise along widthwise spaced side edges 31 of the inside seal 7, thereby to keep the inside seal 7 against lengthwise movement.

Figure 3:
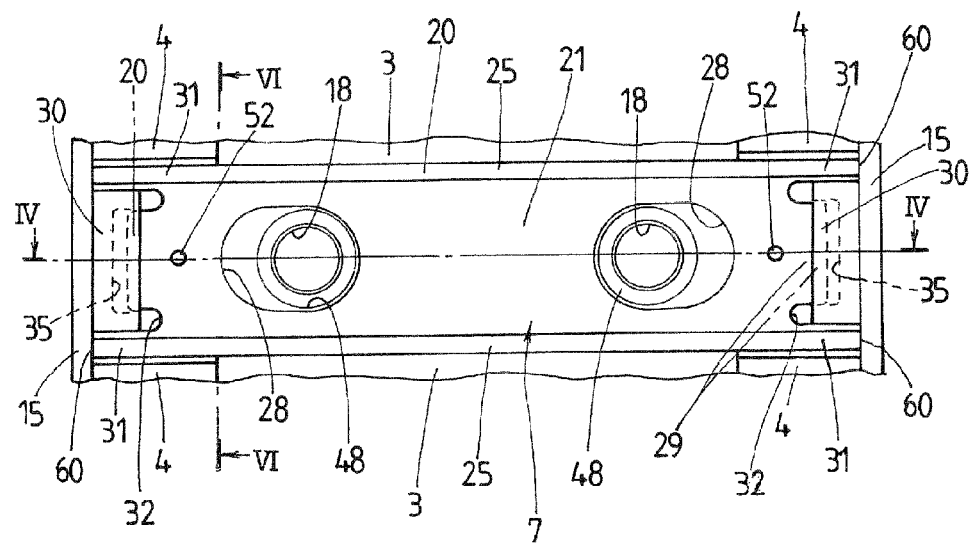
FIG. 3 is a fragmentary view in bottom elevation showing a slider of the linear motion guide unit of FIG. 1, as seen looking into the interior of thereof to illustrate an inside seal installed inside the slider.

The inside sea 7 as shown in FIGS. 3 and 4 is installed to conform to both the recesses 54, 55 defined between the sidewise bulgy portions of the carriage 3 and end caps 4. More particular, the inside seal 7 fits into the recesses 54, 55 to spread over the overall area including the downward surface 33 of the recess 54 inside the carriage 3 and the downward surfaces 34 of the recesses 55 inside the end caps 4 joined to the forward and aft end surfaces of the carriage 3. The inside seal 7 mainly works to keep the load-carrying races 19 free of foreign materials that have eluded the forward and aft end seals 15 with the lips 16 outward to exclude the foreign materials and creped along the top surface 57 of the guide rail 1 inside the slider 2. Most of foreign materials adhering to the top surface 57 of the guide rail 1 lurk in the bolt holes 17 on the guide rail 1, especially in clearances left between the bolt holes 17 and the bolts that fit into their associated bolt holes 17, and enter inside the slider 2 from there. For the protection of the load-carrying races 19 from the foreign materials that has eluded the forward and aft lips 16 outward, the inside seal 7 has the first lips 25 spaced parallel away from each other to extend lengthwise of the guide rail 1 along widthwise spaced side edges of the guide rail 1 while coming into sliding engagement with the top surface 57 of the guide rail 1, thereby excluding the foreign materials from entry to the load-carrying races 19. The first lips 25 are made to extend askew center-ward from the widthwise spaced sides of the downward surface inside the recess of the slider 2 as seen in a section perpendicular to the longitudinal direction and terminate in tips that come into sliding engagement with the top surface 57 of the guide rail 1. The lips 25 askew center-ward or inward are most efficient to keep the load-carrying races 19 free of the foreign materials, even with a little interference of the lips 25 to the guide rail 1.

The inside seal 7 is held in the end caps 4 in a relation that the lugs 29 made at the forward and aft middles of the metallic core 21 fit into their associated slots 35 defined above the mating portions 30 of the forward and aft end caps 4. With the linear motion guide unit constructed as earlier, while the carriage 3 is made therein with the threaded holes 18 each of which is counter-bored at 48 used to install thereon any heavy load including other members, instruments, and so on, the inside seal 7 as shown in FIGS. 3 and 4 is made therein oval holes 28, which correspond in locations to the threaded holes 18 and have sizes enough to see into each counterbore 49 in the carriage 3 to make it possible to insert the fastening bolts into the threaded holes 18 from the downward surface 33 inside the recess 54 of the carriage 3. Thus, the oval holes 28 are each made larger in dimension than the threaded holes 18. The oval holes 28 are made in the metallic core 21 of the inside seal 7 in opposition to the threaded holes 18 in the middle of the carriage 3 in a geometry lying on the middle widthwise of the inside seal 7 at two locations lengthwise apart from one another towards the forward and aft ends of the inside seal 7. Around the widthwise middle of the forward and aft lugs 29 of the metallic core 21, moreover, there are made locating holes 51, which are used to locate accurately the metallic core 21 in preparation for baking or fusion of the joint portion 23 of the sealing member 20 on the metallic core 21. As seen in FIG. 5, the inside seal 7 fits into the groove 6 cut deep into the downward surface 33 inside the recess 54 of the carriage 3 in lengthwise direction of the slider 2. The groove 6 is made as minimum as possible to sidestep the collateral problem negatively affecting the stiffness of the carriage 3. The inside seal 7 fitted Into the groove 6 cut in the carriage 3 has the second lips 26 raised sidewise to come into engagement against their associated inward sidewalls 50 of the groove 6 in the carriage 3. The second lips 26 are made on the widthwise spaced side edges of the metallic core 21 to head toward a direction opposite to the first lips 25 as seen in the transverse section perpendicular to the lengthwise of the metallic core 21. Once the inside seal 7 has fitted into the groove 6 in the carriage 3 to extend along the groove 6, the second lips 26 owing to elasticity serve to urge their associated first lips 25 against the top surface 57 of the guide rail 1 to make smooth sliding-engagement between them. Especially, the second lips 26 function to keep the load-carrying races 19 free of the foreign materials including chips, debris, dirt, dusts, processing fluids, coolants, and so on, which would otherwise creep into the load-carrying races 19 along the downward surface 33 of the carriage 3 after having infiltrated from the top surface 57 of the guide rail 1 through the oval holes 28 into the groove 6 left above the inside seal 7.

The inside seal 7, moreover, includes the joint portions 23 for the sealing members 20, which fit over the lengthwise side edges of the metallic core 21, one to each side edge. On the joint portions 23 constructed as stated earlier, there are provided the mating surfaces 24 to make close engagement with the sunken surface 58 in the groove 6 cut into the carriage 3, preventing the foreign materials from creeping into the load-carrying races 19. The joint portion 23 is made integral with the major portion 22 to fix the lip-type seal including the first lip 25, second lip 26 and the third lip 27 to the metallic core 21, while designed to make the abutment against the sunken surface 58 in the groove 6 cut into the carriage 3, keeping the first lip 25 in a smooth sliding-contact situation. The smooth sliding-engagement or contact of the first lip 25 against the top surface 57 of the guide rail 1 as recited earlier refers to a condition the tip of the lip comes into abutment against the top surface 57 of the guide rail 1 with a slight interference as little as not to increase any resistance that is encountered when the slider 2 travels over the guide rail 1, meaning a sliding-contact situation versatile to respond to changes in external conditions including external force, and so on.

Figure 11:
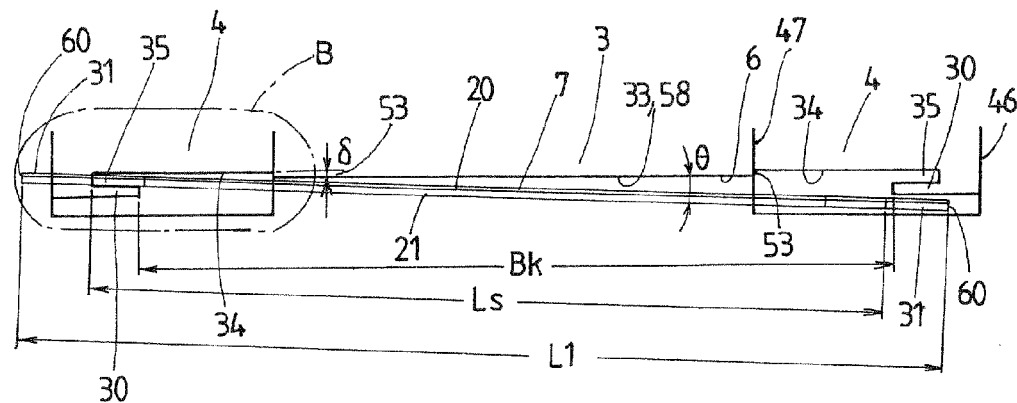
FIG. 11 is a schematic view illustrating about how the inside seal is fitted into the associated end cap.
Figure 12:
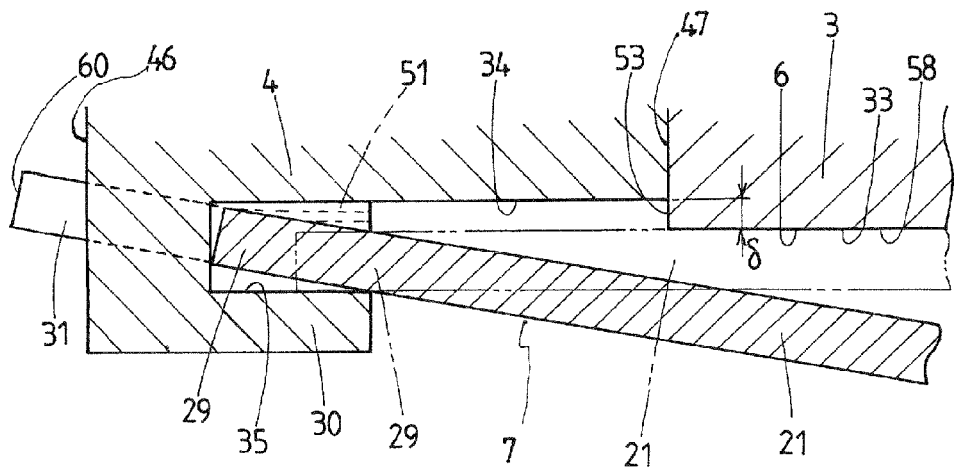
FIG. 12 is an enlarged fragmentary view in section showing in detail a particular portion encircled with a sign B of FIG. 6.
Figure 13:
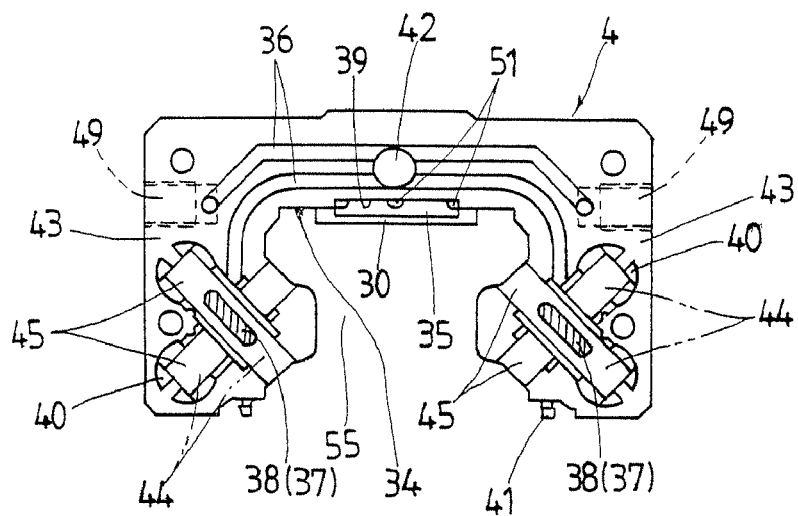
FIG. 13 is a view in rear elevation showing the end cap in the linear motion guide unit of FIG. 1.

The downward surface 34 inside the recess 55 (refer to FIG. 13) of the end cap 4 as shown in FIGS. 11 and 12 is set back upward with respect to the downward surface 33 or the sunken surface 58 inside the groove 6 of the carriage 3 to make a discrepancy or shoulder 53 of δ between them. For easy introduction of the lug 29 of the inside seal 7 askew through the slot 35 open above the mating portion 30 of the end cap 4, especially, the slot 35 is made larger in height than the thickness of the lug 29 of the inside seal 7 while the downward surfaces 34 inside the recesses 55 of the forward and aft end caps 4 are retracted upward by the shoulder of δ with respect to the downward surface 33 of the carriage 3. More especially, the shoulder 53 or discrepancy δ between carriage 3 and the end caps 4 in the slider 2 is provided for redundancies to make it easier to introduce askew any one of the lugs 29 of the inside seal 7 into the associated slot 35 of the end cap 4. With linear motion guide unit in which the end caps 4 are fastened in place to the carriage 3, the slots 35 in the forward and aft end caps 4 are flush with one another while a distance Bk between the slots 35 in the forward and aft end caps 4 is shorter than a distance Ls between outermost ends of the forward and aft lugs 29 of the metallic core 21 for the inside seal 7. As a result, when the inside seal 7 is introduced aslant to any one of slots 35 in a fashion any one of the lugs 29 is raised up, the lug 29 is allowed to fit easily into the associated slot 35. Around the forward and aft ends of the inside seal 7, as apparent in FIGS. 6 and 7, there are provided the third lips 27 raised in opposition to the downward surfaces 34 of the end caps 4 to fill in for the clearances left correspondingly to the shoulders 53 of the end caps 4 retracted in reverse to the carriage 3, thereby coming into close engagement with the downward surfaces 34 inside the recesses 55 of the end caps 4 to seal up the clearances. Thus, the third lips 27 have the function of preventing the foreign materials from creeping along the downward surfaces 34 of the end caps 4 into the load-carrying races 19.

Figure 8:
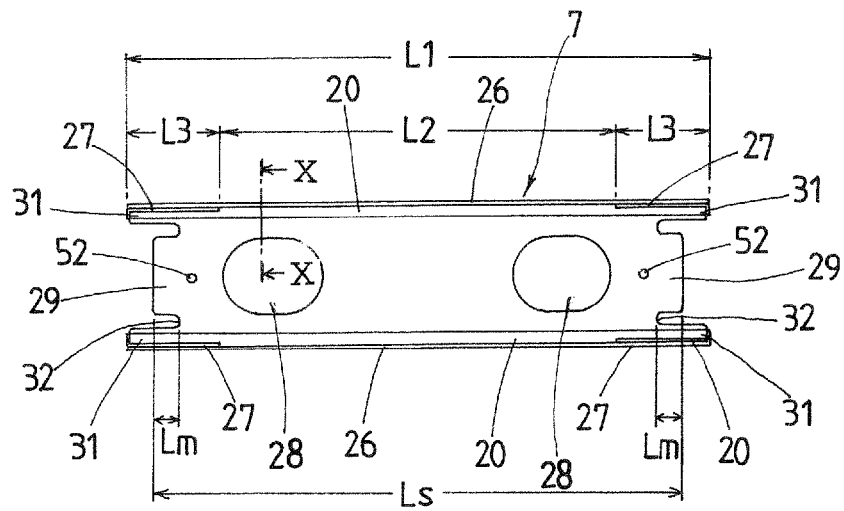
FIG. 8 is a plan view showing an inside seal to be installed inside linear motion guide unit of FIG. 1.
Figure 9:
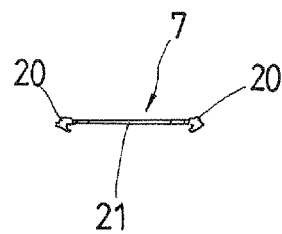
FIG. 9 is a view in end elevation of the inside seal of FIG. 8.
Figure 10:
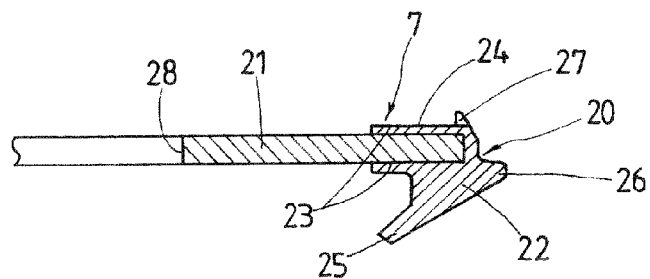
FIG. 10 is a fragmentary view in section of the inside seal of FIG. 8, the view being taken on the plane of the line X-X of that figure.

The inside seal 7 as shown in FIGS. 8 to 10 is composed of the metallic core 21 of rectangular sheet, and the sealing members 20 of synthetic rubber fastened with baking to the widthwise opposing side edges of the metallic core 21. The sealing members 20 include the joint portions 23 baked on the sides of the metallic core 21 to extend across the overall length of the metallic core 21, and the major portions 22 integral with the joint portions 23. Each of the joint portions 23 has the mating surface 24 to make close engagement with the sunken surface 58 in the groove 6 cut into the carriage 3, while the major portions 22 are each provided with the first lip 25 like a tongue in shape in transverse section and extending askew toward the widthwise middle of the guide rail 1 to come into smooth sliding engagement with the top surface 57 of the guide rail 1. Each major portion 22 also has the second lip 26 raised in the directions opposite to the associated first lip 25 to come into close engagement with the sidewall 50 of the groove 6 in the carriage 3, and the third lips 27 raised straight above the major portion 22 adjacent to the mating surface 24 in the direction opposite to the first lip 25 across the areas corresponding the forward and aft end caps 4 midway between the first and second lips 25, 26. Moreover, both the first and second lips 25, 26 are made to extend across the overall length L1 of the inside seal 7, while the mating surface 24 extends over only the major middle length L2. The third lips 27 are each restricted at the forward and aft ends to a length L3 corresponding to the lengthwise dimension of the end cap 4. The length L2 of the mating surface 24 parallels to the overall length of the carriage 3, while the length L3 of the third lip 27 is equivalent to the thickness of the end cap 4.

With the linear motion guide unit of the present invention, the metallic core 21 of the inside seal 7 is cut away partially to make cuts 32 at the forward and aft ends thereof thereby forming the lugs 29 at the middle flanked by the cuts 32 and side edges 31 separated apart from the lugs 29 by the cuts 32 to lie farther sidewise out than the lugs 29. Thus, the metallic core 21 of the inside seal 7 is made at the forward and aft ends thereof with the middle lugs 29 and the sidewise opposite side edges 31 isolated from the middle lugs 29 and extended lengthwise beyond the middle lugs 29. The side edges 31 of the metallic core 21 are placed in a relation the mating portion 30 of the end cap 4 are flanked with them. The inside seal 7 is installed in the end caps 4 in a way the forward and aft lugs 29 fit into their associated slots 35 made above the mating portions 30 of the end caps 4 while the side edges 31 flank the mating portions 30 of the end caps 4.

Figure 14:
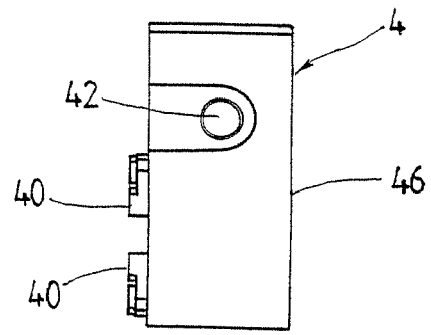
FIG. 14 is a view in side elevation showing the end cap of FIG. 13.
Figure 15:
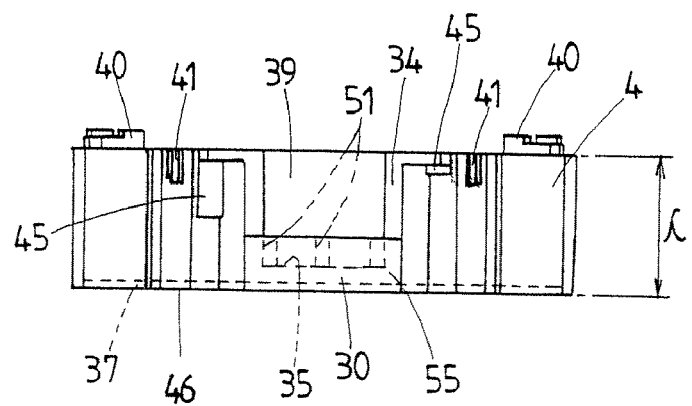
FIG. 15 is a view in bottom elevation showing the end cap of FIG. 13.

With the linear motion guide unit constructed as described earlier, the forward and aft lugs 29 formed on lengthwise opposite ends of the metallic core 21 of the inside seal 7 are made in a fashion that a length Ls across their foremost outward ends is less than the overall length L1 of the inside seal 7 (that is, Ls<L1). A lengthwise dimension Lm of each lug 29 is made less than that of the side edges 31 lying spaced widthwise from one another on the metallic core 21. That is, the side edges 31 are each determined to have the length of ((L1-Ls)/2)+Lm. Thus, when the both the forward and aft lugs 29 of the metallic core 21 have fit into their associated slots 35 in the end caps 4, respectively, the side edges 31 of the metallic core 21 are opposite sides of the mating portions 30 of the end caps 4 to keep in place the inside seal 7. After the inside seal 7 has been installed in the slider 2, the dimension Lm of the lug 29 entered into the slot 35 is short of the length of the side edges 31. Moreover, the mating portion 30 as shown in FIGS. 13 to 15 is raised above the downward surface 34 inside the recess 55 of the end cap 4 at the middle closer to the outward surface 46 of the associated end cap 4.

Referring to FIGS. 11 and 12, there is shown how to make the engagement of the lug 29 of the inside seal 7 with the associated slot 35 above the mating portion 30 of the end cap 4 in the slider 2 in which the end caps 4 are fastened to the forward and aft end surfaces 47 of the carriage 3 and the rollers are installed for free rotation. On installation of the inside seal 7, any one of the forward and aft lugs 29 of the inside seal 7 is first pushed forward through the associated slot 35 while carried on the mating portion 30 of any one of the forward and aft end caps 4 in an orientation tilted somewhat in relation to the downward surface 34 of the end cap 4. After the one lug 29 has been retracted deep into the slot 35, another lug 29 opposite to the one lug 29 is raised as high as the one lug 29 while getting clear of or eluding the associated mating portion 30 of another end cap 4 to bring the inside seal 7 into close abutment against the downward surface 33 of the carriage 3. Then, the another lug 29 is moved in the direction to fit into the slot 35 on the mating portion 30 of the another end cap 4 to the depths the forward end 60 of the metallic core 21 of the inside seal 7 comes into flush with the outward end surface 46 of the another end cap 4. Thereafter, the inside seal 7 is restrained at the forward and aft ends thereof against lengthwise movement. After the installation of the inside seal 7 as stated earlier, the inside seal 7 is steadily held at the forward and aft lugs 29 thereof with three convexities 51 raised inside each the slots 35 of the end caps 4. Finally, the end seals 15 are applied to the outward end surfaces 46 of the end caps 4 to finish assembly of the slider 2. With the linear motion guide unit in which the inside seal 7 is held in place in the end caps 4 in a way the side edges 31 of the metallic core 21 come into abutment at the lengthwise opposite ends 60 thereof against their associated end seals 15 as stated earlier, only loosening the fastening bolts of any one of the end seals 15 is sufficient to move the inside seal 7 in the direction toward the loosened end seal 15 to allow the withdrawal of the lug 29 of the inside seal 7 out of the slot 35 of the end cap 4 having mounted with another end seal 15 opposite to the loosened end seal 15, thereby making it easier to dismantle of the inside seal 7 from the slider 2.

What is claimed is:

1. A linear motion guide unit; comprising an elongated guide rail having a first raceway surface on a side thereof extending in a lengthwise direction of the guide rail, and a slider fitting over and conforming to the guide rail to move lengthwise of the elongated guide rail in a sliding manner by virtue of more than one rolling element, the slider being composed of a carriage having thereon a second raceway surface in opposition to the first raceway surface of the guide rail to define a load-carrying race between them and having therein a return passage extending in parallel with the load-carrying race, end caps secured to forward and aft ends of the carriage, one to each end, and provided therein with turn-around passages joining the load-carrying race and the return passage together with one another, more than one rolling element allowed to roll through a circulating circuit made up of the load-carrying race, return passage and the turnaround passages, and an inside seal fitted to a downward surface inside a recess of the carriage in opposition to a top surface of the guide rail;
  wherein the inside seal is composed of a metallic core of flat metal sheet extending across an overall length of downward surfaces inside the recesses of the carriage and end caps, and a sealing member secured to the metallic core;
  wherein the metallic core is provided at forward and aft ends thereof with lugs, which extend at widthwise middles to come into engagement with their associated mating portions of the end caps to keep the inside seal in the end caps;
  wherein the sealing member includes a first lip coming into sliding engagement with one of widthwise opposing edges of the top surface of the guide rail to prevent foreign materials against creeping along the top surface of the guide rail into the load-carrying race, and a second lip extending sidewise to come into close engagement with an inward sidewall of the recess in the carriage to protect the load-carrying race against foreign materials, which creep along recessed surfaces inside the carriage;
  wherein the second lip extends in a direction opposite to the first lip to keep the first lip at a location to make certain of smooth sliding engagement with the top surface of the guide rail, and
  wherein the first and second lips lie on a common line in a way heading for directions opposite to one another, and wherein the first lip extends inward of the inside seal while the second lip heads outward.

2. A linear motion guide unit constructed as defined in claim 1, wherein the sealing member of the inside seal is composed of a joint portion having a mating surface to make close engagement with a downward surface deep sunken inside the recess cut into the carriage, the joint portion being secured to one of widthwise opposing edges of the metallic core, and a major portion integral with the joint portion and having the first lip and second lip, which are all made integrally with the major portion.

3. A linear motion guide unit constructed as defined in claim 2, wherein the joint portion is fastened to the metallic core to keep the first lip at a situation to ensure smooth sliding engagement with the top surface of the guide rail while keeping the second lip at a location to make secure engagement with the associated sidewall inside the recess made in the carriage.

4. A linear motion guide unit constructed as defined in claim 1, wherein the mating portion of the end cap defines a slot to allow the associated lug of the inside seal entering there, and wherein the slot is made to include a relieving depression cut in the downward surface inside the recess of the end cap.

5. A linear motion guide unit constructed as defined in claim 4, wherein the downward surfaces inside the end caps are set back upward with respect to the downward surface inside the carriage to make shoulders between them to make it easier to introduce the metallic core of the inside seal into the slot while carried on the mating portion of one of the end caps in an orientation tilted somewhat in relation to the end cap.

6. A linear motion guide unit constructed as defined in claim 1, wherein the sealing member has third lips provided at forward and aft ends of the metallic core to make close engagement with the downward surfaces inside the end caps, keeping foreign materials against creeping along the downward surfaces of the end caps into the load-carrying races.

7. A linear motion guide unit constructed as defined in claim 1, wherein the metallic core of the inside seal is made at the forward and aft ends thereof with the middle lugs and sidewise opposite side edges isolated from the middle lugs by cuts and extended lengthwise beyond the middle lugs, and wherein the side edges are placed in a relation the mating portion of the end cap are flanked with them.

8. A linear motion guide unit constructed as defined in claim 7, wherein the metallic core of the inside seal is first pushed in an orientation tilted somewhat forward through the associated slot while carried on the mating portion of one of the forward and aft end caps coupled together to the forward and aft end surfaces of the carriage, and then the end seals are fastened on outward surfaces of the end caps to come into abutment against foremost ends of the side edges of the metallic core to keep the inside seal in place.

* * * * *